March 30, 1954 F. K. H. NALLINGER ET AL 2,673,745
AXLE SUSPENSION FOR VEHICLES, ESPECIALLY MOTOR VEHICLES
Filed March 21, 1950
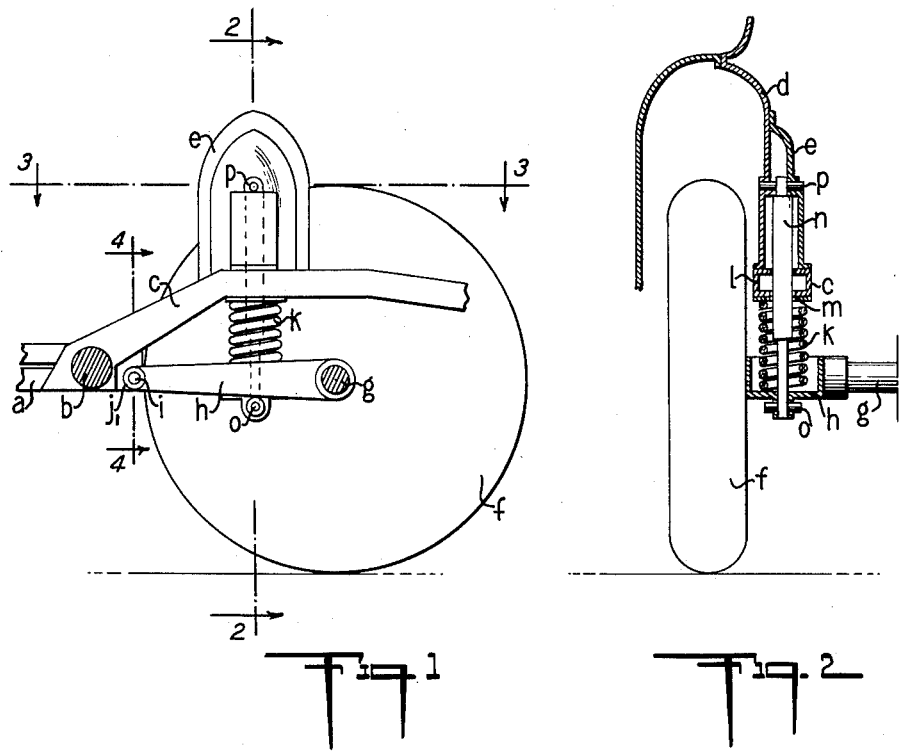
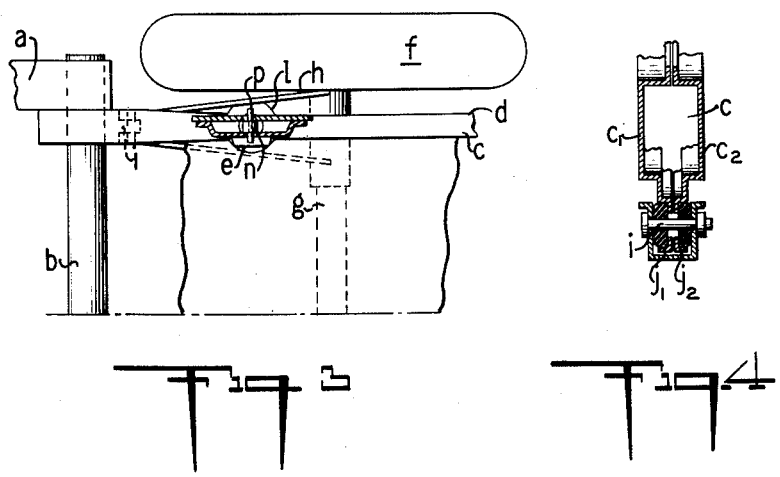
INVENTOR
FRIEDRICH K. H. NALLINGER
JOSEF MÜLLER
BY Haseltine Lake & Co.,
AGENTS Patented Mar. 30, 1954

2,673,745

UNITED STATES PATENT OFFICE 2,673,745

AXLE SUSPENSION FOR VEHICLES, ESPECIALLY MOTOR VEHICLES

Friedrich K. H. Nallinger and Josef Müller, Stuttgart, Germany, assignors to Daimler-Benz Aktiengesellschaft, Stuttgart - Unterturkheim, Germany Application March 21, 1950, Serial No. 150,846

Claims priority, application Germany March 22, 1949

5 Claims. (Cl. 280—124)

The invention relates to a wheel suspension for vehicles, especially for motor-vehicles. Its object is the provision of an improved wheel suspension in which the shocks liable to be transferred from the wheels to the frame and body of the vehicle will be absorbed in a very effective manner. Furthermore it is an object of the invention to provide a suitable, compact and simple construction of the wheel suspension, especially also of the spring suspension and the shock-absorber, another object of the present invention is a reduction of the weight of the vehicle to a minimum.

It is a characteristic feature of the invention that a spring, preferably a coil spring and a shock-absorber arranged inside the spring (preferably a telescopic shock-absorber) are supported centrically on a frame girder (preferably a longitudinal frame girder in a manner precluding any essential twisting torque. According to the invention each of two guiding links, preferably each of two strut members guiding an axle member common to both wheels is pivotally connected to a girder of the frame (which may form a part of a self-supporting body) immediately therebelow and is braced thereagainst by a spring as well as by the shock-absorber in such a way that all forces transferred by the wheel pressure over the guiding link to the girder through the link pivot, spring suspension and shock-absorber support have a centrical effect on the girder, without giving rise to twisting torques.

The upper support of the shock-absorber rods can be effected, in the case of a self-supporting body, on the wall of the body, for instance in such a way that the shock-absorber rod is supported on a joint which is arranged in the external wall of the body and a reinforcing wall parallel to the external wall and attached thereto forming a U-shaped pocket.

Further characteristic features and advantages of the invention can be seen from the following description of an example.

Figure 1 is a side view of the rear axle suspension of a motor vehicle,

Figure 2 is a section along the line 2—2 of Figure 1 with the external or fender wall added, Figure 3 is a top view on the arrangement and a partial section along the line 3—3 of Figure 1 and Figure 4 is a section along the line 4—4 of Figure 1.

The frame forming part of a self-supporting body includes a box-shaped longitudinal girder $a$, a transverse tubular girder $b$ and a longitudinal girder $c$ forming an extension of the longitudinal girder $a$ and offset to the inside by the width of one girder, the girder $c$ consisting of two sections $c_1$ and $c_2$, formed by channel beams put together (especially welded together) with a vertical joint. The girders $a$, $b$ and $c$ are rigidly connected with each other in a suitable way, for instance by welding. Furthermore the external side wall $d$ of the body and a U-shaped stamped reinforcing plate $e$ are firmly connected, preferably also by welding, on either side of plane 2—2.

The rear wheels $f$ are mounted on a tubular rigid or half-rigid axle $g$. The latter is mounted for oscillation about the point $i$ of the frame being pivotally connected thereto on both sides of the vehicle by means of the strut members $h$ which are formed by channel beams having a U-shaped profile, open at the top. The pivotal connection is suitably effected by the insertion of elastic bumpers, for instance rubber bumpers. For that purpose the girder sections $c_1$ and $c_2$ are provided with fin-shaped projections $j_1$ and $j_2$, serving as pivot bearing rubber bumpers being interposed. For the spring suspension of the axle the coil springs $k$ are furthermore used, each of which is supported on the one side directly on the web of one of the U-shaped strut members and in its turn supports centrally one of the longitudinal girders $c$ of the frame. At point $l$ of the spring suspension the longitudinal girder $c$ has a width corresponding to the spring diameter and is provided with an opening $m$ arranged axially of the spring, a telescopic shock-absorber $n$ constituting a link projecting therethrough. The latter is pivoted on the one hand by a joint $o$ to the strut member $h$ and on the other hand by a joint $p$ to the body side wall $d$ and a plate $e$, rubber bumpers being preferably interposed. The wall $d$ and the reinforcing plate $e$ include the shock-absorber in a shell- or pocketlike way. It will be noted from Figs. 1, 2 and 3 that the hollow plate $e$ has its lateral and upper edges rigidly connected with the side wall so as to constitute a pocket accommodating the upper end of the shock-absorber. Thus the forces are transferred to the body in an especially effective way.

In the arrangement according to the invention the wheel pressures and the axle forces transferred to the strut member are all transferred centrally to the longitudinal frame girder $c$, that is in such a way that substantially no twisting torques are produced in the latter. The member $h$ with its joint $i$, the spring $k$ and the shock-absorber $n$ are for this purpose arranged in the same vertical longitudinal plane as the longitudinal frame girder $c$. The longitudinal girder $c$ is furthermore put as near as possible to the wheel f.

The invention is not limited to the shown example, but can be varied in numerous ways within the scope of the appended claims. It can be applied to the suspension of driven and not-driven wheels or axles, to front axles as well as to rear axles. More particularly, the invention is applicable to the suspension of wheels driven by means of shafts including two universal joints.

What we claim is:

1. In a vehicle, the combination comprising a frame girder having a hole, a wheel, an arm pivotally connected to said girder and extending beneath thereof and carrying said wheel, spring means associated with said arm and said girder, a shock-absorber of the telescopic type linked to said arm at a point beneath said hole and extending upwardly through said hole, a body side wall attached to said frame girder and extending on the one side of the upper end of said shock-absorber, a hollow plate extending on the other side of said shock-absorber and having its lateral and upper rims rigidly connected with said side wall so as to constitute a pocket accommodating said upper end, and means for connecting said upper end to said side wall and to said plate.

2. The combination claimed in claim 1 in which said spring means comprises a coil spring surrounding said shock-absorber and inserted between said arm and said girder.

3. The combination claimed in claim 1 in which said frame girder comprises two sheet metal channel beams having spaced parallel webs and opposed flanges having their rims welded to one another, the lower flanges of said channel beams having offset portions, means being supported by said portions for the pivotal connection of said arms thereto.

4. The combination claimed in claim 1 in which said frame girder comprises two sheet metal channel beams having spaced parallel webs and opposed flanges having their rims welded to one another, the lower flanges of said channel beams having offset portions, resilient means being supported by said portions for the pivotal connection of said arms thereto.

5. The combination claimed in claim 1 in which said arm is formed by a channel beam having upwardly projecting flanges, said spring means comprising a coil spring resting on the web of said channel beam.

FRIEDRICH K. H. NALLINGER.
JOSEF MÜLLER.

References Cited in the file of this patent
UNITED STATES PATENTS

| Number | Name | Date |
|---|---|---|
| 2,026,909 | Nallinger | Jan. 7, 1936 |
| 2,052,064 | Whisenand | Aug. 25, 1936 |
| 2,123,087 | Leighton | July 5, 1938 |
| 2,314,505 | McIntyre et al. | Mar. 23, 1943 |
| 2,352,446 | Pointer | June 27, 1944 |
| 2,483,185 | Crabtree | Sept. 27, 1949 |
| 2,529,806 | Konopka | Nov. 14, 1950 |